US012639412B2

(12) United States Patent
Chowdhary et al.

(10) Patent No.: US 12,639,412 B2
(45) Date of Patent: May 26, 2026

(54) APPLICATION ACCESS MANAGEMENT BASED ON BIOMETRIC BEHAVIOR

(71) Applicant: International Business Machines Corporation, Armonk, NY (US)

(72) Inventors: Pawan Raghunath Chowdhary, San Jose, CA (US); Dinesh C. Verma, New Castle, NY (US); Satishkumar Sadagopan, Overland Park, KS (US); Gerald Coon, Durham, NC (US); Mathews Thomas, Flower Mound, TX (US); Utpal Mangla, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 18/617,914

(22) Filed: Mar. 27, 2024

(65) Prior Publication Data

US 2025/0307362 A1 Oct. 2, 2025

(51) Int. Cl.
*G06F 21/32* (2013.01)

(52) U.S. Cl.
CPC .................................... *G06F 21/32* (2013.01)

(58) Field of Classification Search
CPC ....................................................... G06F 21/32
USPC ........................................................... 713/186
See application file for complete search history.

(56) References Cited

U.S. PATENT DOCUMENTS

| | | | |
|---|---|---|---|
| 7,130,452 B2 | 10/2006 | Bolle | |
| 9,762,588 B2 | 9/2017 | Hudack | |
| 10,230,723 B2 * | 3/2019 | Korus | ..................... G06F 21/32 |
| 10,810,510 B2 | 10/2020 | Baracaldo Angel | |
| 11,244,757 B1 * | 2/2022 | Gabay | .................. G06V 40/161 |

(Continued)

FOREIGN PATENT DOCUMENTS

| | | |
|---|---|---|
| CN | 106415570 B | 8/2019 |
| EP | 1873999 A1 | 1/2008 |
| EP | 3019991 B1 | 2/2019 |

OTHER PUBLICATIONS

Biger-Levin, Ayelet, "What Is Behavioral Biometrics?", BioCatch Blog, Accessed on Jan. 5, 2024, 3 Pages.

(Continued)

*Primary Examiner* — Anthony D Brown
(74) *Attorney, Agent, or Firm* — Anthony M. Pallone

(57) ABSTRACT

According to one embodiment, a method, computer system, and computer program product for managing application access is provided. The embodiment may include receiving real-time biometric data of a user as the user interacts with a computing device and deriving a real-time biometric signature of the user based on the received real-time biometric data. Responsive to determining that the real-time biometric signature is known, the embodiment may include identifying the user, computing a confidence score of the real-time biometric signature, and configuring application access and application functionality available to the user via the computing device based on the identification of the user and the computed confidence score. The embodiment may include continuously performing the receiving and the deriving as the user interacts with the computing device. While a successive real-time biometric signature is known, the embodiment may include continuously performing the identifying, the computing, and the configuring.

20 Claims, 4 Drawing Sheets

100

(56) References Cited

U.S. PATENT DOCUMENTS

| | | | |
|---|---|---|---|
| 11,451,532 B2 | 9/2022 | Arif Khan | |
| 11,620,370 B2 * | 4/2023 | Douglas | G06F 21/32 |
| | | | 713/186 |
| 2016/0182503 A1 * | 6/2016 | Cheng | H04W 12/082 |
| | | | 726/7 |
| 2017/0109514 A1 * | 4/2017 | Cheng | H04L 63/0861 |
| 2019/0220583 A1 * | 7/2019 | Douglas | G06V 40/70 |
| 2021/0383410 A1 | 12/2021 | Talib | |
| 2022/0029981 A1 * | 1/2022 | Mavani | H04L 63/0861 |

OTHER PUBLICATIONS

Callsign, "Behavioral Biometric Authentication", Callsign Inc., Accessed on Jan. 5, 2024, 4 Pages.

Kover, Amy, "What are behavioral biometrics?", Mastercard Newsroom, Nov. 15, 2021, 2 Pages.

Nerini et al., "Augmented PIN Authentication through Behavioral Biometrics", MDPI, Journals, Sensors, vol. 22, Issue 13, Jun. 27, 2022, 15 Pages.

Plurilock, "Behavioural Biometric Authentication", Plurilock Security Inc., Accessed on Jan. 5, 2024, 45 Pages.

Rees, Megan, "The Future of User Authentication: A Guide to Behavioral Biometrics", Expert Insights, Mar. 28, 2023, 6 Pages.

Shah, Javed, "What Is Behavioral Biometric Authentication?", Security Boulevard, Sep. 30, 2022, 4 Pages.

Stern et al., "A Basic iPhone Feature Helps Criminals Steal Your Entire Digital Life", The Wall Street Journal, Feb. 24, 2023, 1 Page.

* cited by examiner

100

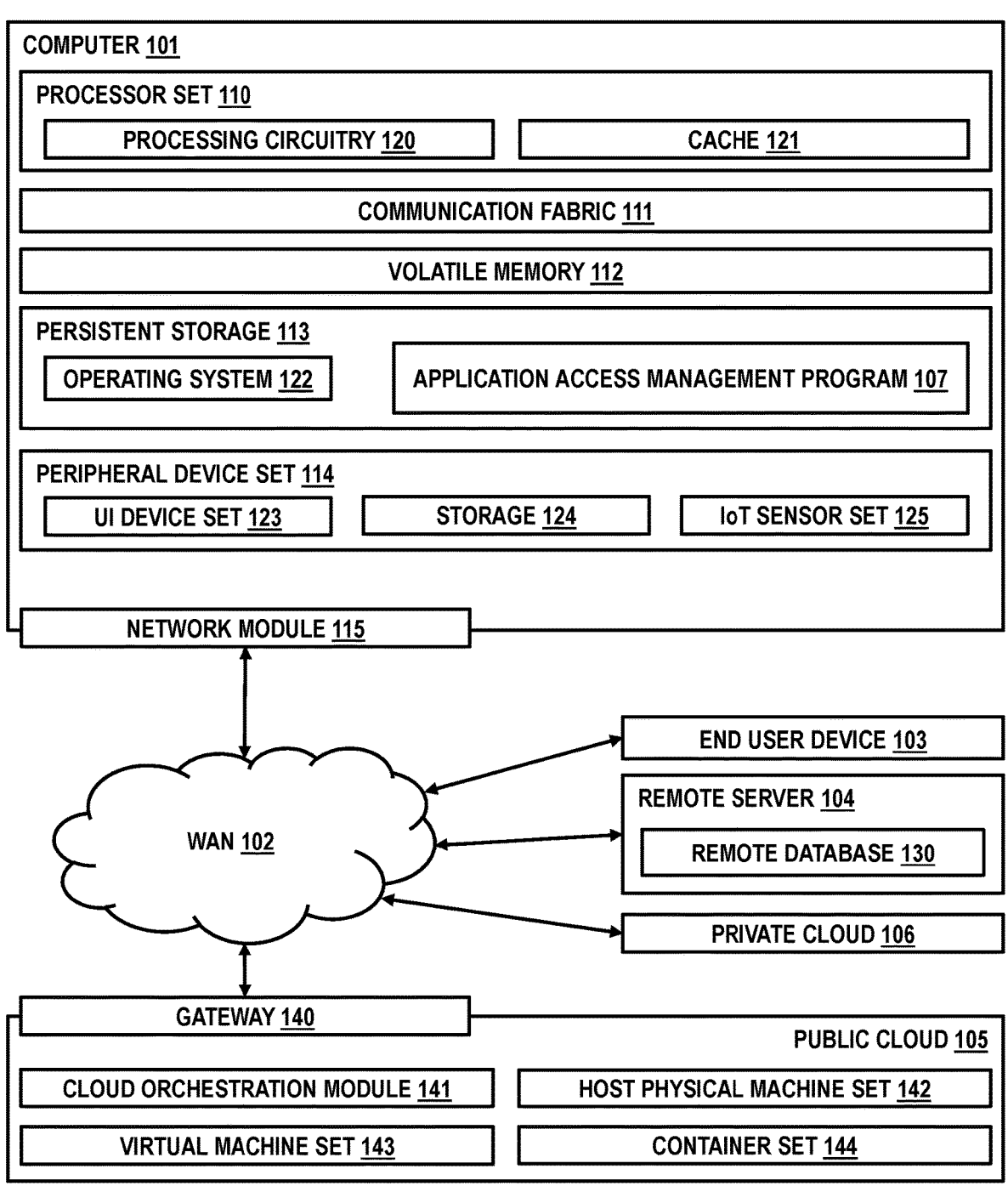

COMPUTER 101

PROCESSOR SET 110

PROCESSING CIRCUITRY 120 | CACHE 121

COMMUNICATION FABRIC 111

VOLATILE MEMORY 112

PERSISTENT STORAGE 113

OPERATING SYSTEM 122 | APPLICATION ACCESS MANAGEMENT PROGRAM 107

PERIPHERAL DEVICE SET 114

UI DEVICE SET 123 | STORAGE 124 | IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 | HOST PHYSICAL MACHINE SET 142

VIRTUAL MACHINE SET 143 | CONTAINER SET 144

*Figure 1*

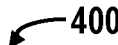
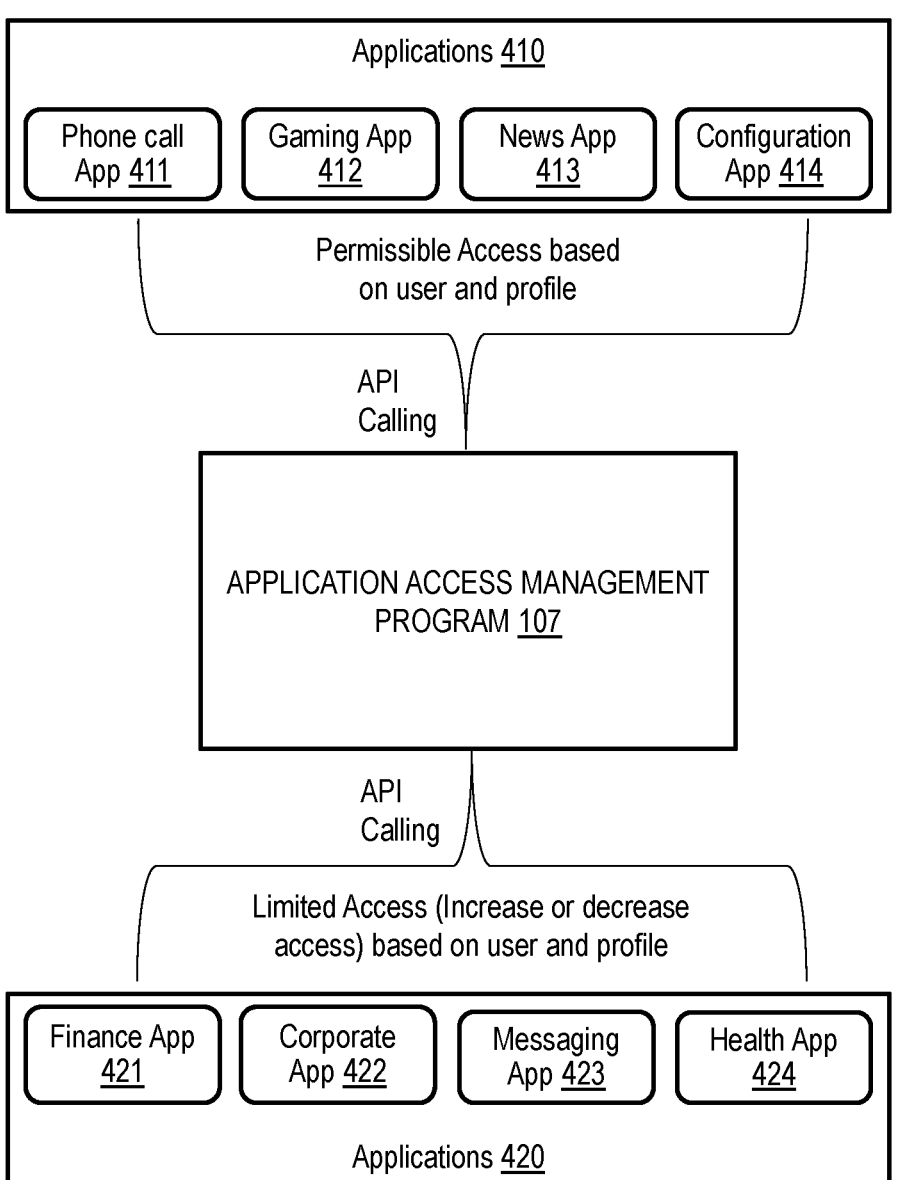
*Figure 4*

APPLICATION ACCESS MANAGEMENT BASED ON BIOMETRIC BEHAVIOR

BACKGROUND

The present invention relates generally to the field of computing, and more particularly to application access control.

Application access control refers to the process of regulating access to specific software applications or services based on the identity and permissions of users or entities. It focuses on managing who can use, modify, or interact with a software application and its data; thus, ensuring that only authorized individuals or systems can access the functionalities and resources of the software application. Effective application access control may require a combination of technical controls, such as enabling access management features built into an application itself, as well administrative policies, and procedures to ensure that users have appropriate application access while preventing unauthorized access or misuse. As such, application access control is essential for maintaining the security, integrity, and confidentiality of sensitive information of individuals and organizations. By implementing robust access management practices, organizations may mitigate the risk of unauthorized device and application access, data breaches, and insider threats, while enabling users to securely access needed applications and services.

SUMMARY

According to one embodiment, a method, computer system, and computer program product for managing application access is provided. The embodiment may include receiving real-time biometric data of a user as the user interacts with a computing device. The embodiment may include deriving a real-time biometric signature of the user based on the received real-time biometric data. Responsive to determining that the real-time biometric signature is known, the embodiment may include identifying the user, and computing a confidence score of the real-time biometric signature. The embodiment may include configuring application access and application functionality available to the user via the computing device based on the identification of the user and the computed confidence score. The embodiment may include continuously performing the receiving and the deriving as the user interacts with the computing device. While a successive real-time biometric signature is known, the embodiment may include continuously performing the identifying, the computing, and the configuring as the user interacts with the computing device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computer environment, according to at least one embodiment.

FIG. 4 illustrates a framework for allowing application developers to access features of the application access management process, according to at least one embodiment.

DETAILED DESCRIPTION

Figure 2:
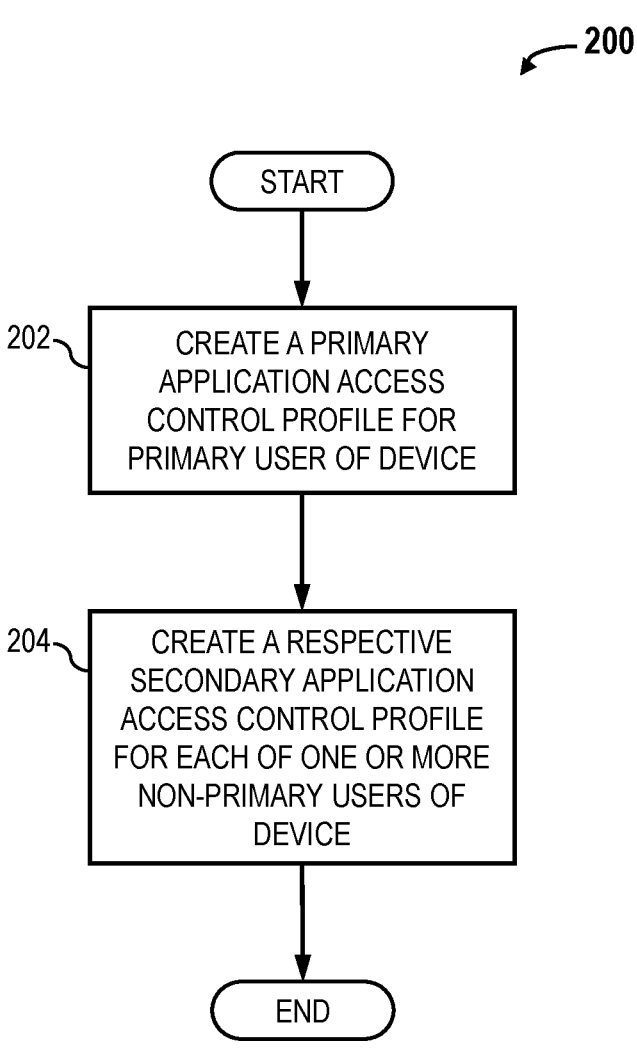
FIG. 2 illustrates an operational flowchart for defining application access control profiles for a computing device via an application access management setup process, according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to application access control. The following described exemplary embodiments provide a system, method, and program product to, among other things, manage access and functionality of one or more applications available to a user based on a biometric signature of the user. Therefore, the present embodiment has the capacity to improve the technical fields of application access control by dynamically increasing or decreasing levels of application access and functionality in response an assessed behavior and biometric pattern of an application user, thus providing an appropriate level of application access and functionality for the user while preventing unauthorized application access or misuse.

As previously described, application access control refers to the process of regulating access to specific software applications or services based on the identity and permissions of users or entities. It focuses on managing who can use, modify, or interact with a software application and its data; thus, ensuring that only authorized individuals or systems can access the functionalities and resources of the software application. Effective application access control may require a combination of technical controls, such as enabling access management features built into an application itself, as well administrative policies, and procedures to ensure that users have appropriate application access while preventing unauthorized access or misuse. As such, application access control is essential for maintaining the security, integrity, and confidentiality of sensitive information of individuals and organizations. By implementing robust access management practices, organizations may mitigate the risk of unauthorized device and application access, data breaches, and insider threats, while enabling users to securely access needed applications and services.

Furthermore, as use of mobile devices has become increasingly common for performing tasks within enterprise and personal computing environments, the ability to manage appropriate access, by valid users of these devices, to corporate and other software applications has accordingly become increasingly critical. In general, current mobile device manufacturer security centers around a scenario in which an unauthorized user (i.e., a bad actor) hacks into a device. However, a scenario in which a potential bad actor has gained access to, and control of, the device through seemingly permissible means (e.g., entering a passcode or other valid log-in data) may not be typically considered. For example, there may be instances where a bad actor gains access to a user's mobile device by gaining access to a valid passcode, and subsequently shuts the user out of their device. Once in control of the device, the bad actor may access financial or corporate applications of the user for nefarious purposes. For instance, a bad actor having entered a valid passcode and now in control of a user's device may transfer money from a financial institution of the user via access to the institution's application installed on the device, or the bad actor may access credit card information stored on the user's device to make one or more purchases. Unfortunately, mobile device companies and/or application owners are often unable to intercede as the passcode was known to the bad actor. As another example, there may be instances where the bad actor forcibly gains access to a mobile device of a vulnerable user (e.g., the bad actor directs an elderly user to look at their smartphone or forces the user to log-in to their smartphone and hand it over) and uses the mobile device to commit a crime. As yet another example, there may be instances where a mobile device of a user is merely shared with another user (e.g., a user allows their smartphone to be used by a family member). Although this example does not involve a bad actor, it may nevertheless be desirable to limit application access and/or functionality available to the other (i.e., the shared with) user.

It may therefore be imperative to have an application access management system in place to govern available access and functionality of applications of a computing device based on a biometric signature of a user of the computing device. Thus, embodiments of the present invention may be advantageous to, among other things, receive biometric data of a device user from one or more sensors, perform natural language processing on voice input of a device user, utilize a machine learning model to derive a biometric signature of a device user, create application access control profiles for one or more users of a device, compare one or more known biometric signatures with a biometric signature of a device user derived in real-time, calculate a confidence score for a derived biometric signature, configure accessibility and/or available functionality of an application of a device based on a biometric signature and corresponding confidence score of a user of the device, configure levels of application access and functionality based on confidence score thresholds, dynamically increase or decrease available functionality of an application in response to a biometric signature and corresponding confidence score of a device user derived in real-time, hide and/or disable an application of a device, identify a gesture indicative of an adverse situation, provide a decoy interface for an application of a device, control device accessibility based on a derived biometric signature and/or detected adverse situation, and notify an application provider or other authority of a detected adverse situation. The present invention does not require that all advantages need to be incorporated into every embodiment of the invention.

According to at least one embodiment, an application access management program may receive a set of biometric data of a user of a computing device. The biometric data may be received from one or more sensors integrated within the computing device or separate from the computing device. According to at least one embodiment, the application access management program may derive, using a machine learning model, a biometric signature of the user based on behavioral patterns observed within the received set of biometric data of the user. According to at least one embodiment, in response to determining that the derived biometric signature of the user is known, the application access management program may identify the user and compute confidence score corresponding to the derived biometric signature. Further, according to at least one embodiment, the application access management program may specify a level of access and functionality for one or more applications of the computing device based on the identification of the user and the computed confidence score. According to at least one other embodiment, in response to determining that the derived biometric signature of the user is not known, the application access management program may determine whether an adverse situation is detected. Where an adverse situation is detected, the application access management program may perform one or more evasive actions. According to at least one further embodiment, where the biometric signature of the user is not known and an adverse situation is not detected, the application access management program may disable access to the computing device by the user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to control access and functionality of applications on a computing device based on a biometric behavior pattern of a user of the computing device.

Referring to FIG. 1, an exemplary computing environment 100 is depicted, according to at least one embodiment. Computing environment 100 contains an example of an environment for the execution of at least some of the computer code involved in performing the inventive methods, such as application access management (AAM) program 107. In addition to AAM program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AAM program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program, such as AAM program 107, and accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in AAM program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in AAM program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, biometric sensors, and wearable cameras), keyboard, mouse, printer, touchpad, touchscreen, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, another sensor may be a digital image capture device (e.g., a camera) capable of capturing and transmitting one or more still digital images or a stream of digital images (e.g., digital video), another sensor may be an inertial measurement unit (e.g., accelerometer, gyroscope, magnetometer), another sensor may be a pressure sensor, another sensor may be a tactile sensor, another sensor may be an ultrasonic distance measurement unit, another sensor may be a capacitive touch sensor, and yet other sensors may be one or more biometric sensors capable of capturing biometric data (e.g., height, heartrate, breathing rate, blood pressure, perspiration, pupil dilation, speech, speaking rate, voice pitch/tone, etc.) of a user of computer 101.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an edge device capable of connecting to computer 101 via WAN 102 and network module 115 and capable of receiving instructions from AAM program 107. According to at least one further embodiment, in addition to taking any of the forms discussed above with computer 101, EUD 103 may further be an IoT biometric sensor capable of connecting to computer 101 via WAN 102 and network module 115 and capable of capturing biometric data of a user of computer 101 and transmitting captured biometric data to AAM program 107.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The AAM program 107 may be a program capable of receiving biometric data of a device user from one or more sensors, performing natural language processing on voice input of a device user, utilizing a machine learning model to derive a biometric signature of a device user, creating application access control profiles for one or more users of a device, comparing one or more known biometric signatures with a biometric signature of a device user derived in real-time, calculating a confidence score for a derived biometric signature, configuring accessibility and/or available functionality of an application of a device based on a biometric signature and corresponding confidence score of a user of the device, configuring levels of application access and functionality based on confidence score thresholds, dynamically increasing or decreasing available functionality of an application in response to a biometric signature and corresponding confidence score of a device user derived in real-time, hiding and/or disabling an application of a device, identifying a gesture indicative of an adverse situation, providing a decoy interface for an application of a device, controlling device accessibility based on a derived biometric signature and/or detected adverse situation, and notifying an application provider or other authority of a detected adverse situation. In at least one embodiment, AAM program 107 may require a user to opt-in to system usage upon opening or installation of AAM program 107. Notwithstanding depiction in computer 101, AAM program 107 may be stored in and/or executed by, individually or in any combination, end user device 103, remote server 104, public cloud 105, and private cloud 106 so that functionality may be separated among the devices. The synthetic application access management method is explained in further detail below with respect to FIG. 2 and FIG. 3.

Referring now to FIG. 2, an operational flowchart for defining application access control profiles for a computing device via an application access management setup process 200 is depicted according to at least one embodiment. At 202, AAM program 107 creates a primary application access control profile for a primary user of a computing device (e.g., computer 101). According to at least one embodiment, the computing device may be a smartphone and the primary user may be the owner of the smartphone. As part of creating the primary application access control profile, AAM program 107 may prompt the primary user to perform a series of actions with the computing device so that biometric data of the primary user may be received by AAM program 107. For example, in the context of an owner of a smartphone, AAM program 107 may direct the owner to perform actions such as, but not limited to, looking at a camera of the smartphone so that facial measurements of the owner may be collected, placing a finger on a touch sensor of the smartphone so that a fingerprint of the owner may be obtained, taping and/or finger gesturing on a portion of a touchscreen of the smartphone so that measurements of exerted tactile force (e.g., average pressure) and other unique haptic information of the owner may be obtained, typing out displayed text via an on-screen keyboard of the smartphone so that a word typing speed of the owner may be obtained, and walking and/or moving with the smartphone so that a walking gate and/or characteristic accelerations of the owner may be obtained. Further, AAM program 107 may direct the owner to speak aloud so that voice input of the owner may be collected via a microphone of the smartphone. AAM program 107 may then perform natural language processing (NLP) (e.g., NLP and large language model (LLM) processing) on the collected voice input so that further biometric data such as, but not limited to, rate of speech, pitch, tone, and vocabulary of the owner may be obtained. In addition, location information of the owner may be identified via a GPS receiver of the smartphone and included as part of the owner's biometric data received by AAM program 107.

According to at least one embodiment, while the above-mentioned biometrics may be captured by IoT sensors and/or peripheral devices integrated within the computing device (e.g., the smartphone), AAM program 107 may also receive biometric data of the primary user (e.g., the owner) from one or more external IoT sensors in communication with AAM program 107. For example, AAM program 107 may additionally receive biometric data such as, but not limited to, heartrate, blood pressure, and/or perspiration of the owner from IoT sensors worn by the owner and in communication with AAM program 107 located on their smartphone.

Continuing with 202, and in furtherance of creating the primary application access control profile for the primary user of the computing device, AAM program 107 may utilize known machine learning model capabilities (e.g., a convolutional neural network (CNN)) to create a unique biometric signature of the primary user. According to at least one embodiment, AAM program 107 may input the received biometric data of the primary user, as discussed above, into a CNN. Via the CNN, AAM program 107 may combine one or more behavioral patterns learned from each type of input biometric data, evaluate variabilities (e.g., precision, accuracy) of sensors capturing the input biometric data, and output a unique biometric model (i.e., biometric signature) of the primary user. AAM program 107 may create the primary application access control profile for the primary user and associate their biometric signature with the profile. Furthermore, according to at least one embodiment, AAM program 107 may enable the primary user to define, within the primary application access control profile, an identity of the primary user, a listing or categories of applications which may be accessed by the primary user via the computing device, confidence value/score thresholds for enabling varying levels of functionality (i.e., permissible features available via application programming interface (API) calls) for applications accessible by the primary user via the computing device, gestures (e.g., tapping patterns) and/or computing device movements (e.g., shaking the device) which indicate a situation adverse to the primary user, and one or more evasive actions to be performed in response to a determined adverse situation. For example, the primary application access control profile for the owner of the smartphone may specify that the owner has full access (i.e., access with unrestricted functionality or unrestricted API calling ability) to all applications on the smartphone where a confidence score exceeds a threshold of eighty percent, limited access (i.e., access with limited functionality or limited API calling ability) to all applications on the smartphone where a confidence score falls between thresholds of fifty and eighty percent, and access to only a defined set of applications on the smartphone where a confidence score falls below a threshold of fifty percent. The created primary application access control profile for the primary user may be stored within storage 124 or remote database 130 for later modification and/or reference by AAM program 107.

At 204, AAM program 107 creates a respective secondary application access control profile for each of one or more non-primary users of a computing device (e.g., computer 101). According to at least one embodiment, the computing device may be a smartphone and a non-primary user may be a family member of the owner (i.e., primary user) of the smartphone. As part of creating a secondary application access control profile, AAM program 107 may prompt the non-primary user to perform a series of actions with the computing device so that biometric data of the non-primary user may be received by AAM program 107, and a unique biometric signature of the non-primary user may be derived in a similar fashion as described above in step 202. Furthermore, according to at least one embodiment, AAM program 107 may enable the primary user to define, within the secondary application access control profile, an identity of the non-primary user, a listing or categories of applications which may be accessed by the non-primary user via the computing device, confidence value/score thresholds for enabling varying levels of functionality (i.e., permissible features available via API calls) for applications accessible by the non-primary user via the computing device, gestures (e.g., tapping patterns) and/or computing device movements (e.g., shaking the device) which indicate a situation adverse to the non-primary user, and one or more evasive actions to be performed in response to a determined adverse situation. For example, the secondary application access control profile for the family member of the owner of the smartphone may specify that the family member has full access (i.e., access with unrestricted functionality or unrestricted API calling ability) to a defined set or category of applications on the smartphone where a confidence score exceeds a threshold of eighty percent, limited access (i.e., access with limited functionality or limited API calling ability) to a defined set or category of applications on the smartphone where a confidence score falls between thresholds of fifty and eighty percent, and no access to applications on the smartphone where a confidence score falls below a threshold of fifty percent. The created secondary application access control profile for the non-primary user may be stored within storage 124 or remote database 130 for subsequent modification and/or reference by AAM program 107.

According to at least one other embodiment, during the application access management setup process 200, AAM program 107 may also enable the primary user to define one or more biometric thresholds (e.g., a heartrate threshold, a blood pressure threshold, a voice clarity threshold) and/or one or more gestures (e.g., tapping patterns, device movement patterns) which are indicative of the existence of an adverse situation. These biometric thresholds and/or gestures may not be associated with a particular application access control profile, but rather, they may be implemented as adverse situation triggers/settings (AST/S) which may be activated by all users of the computing device. Where AAM program 107 determines that one or more biometric thresholds have been exceeded and/or one or more gestures have been detected, AAM program 107 may further determine the existence of an adverse situation of the user. In such an embodiment, AAM program 107 may also identify a context or type of an application (e.g., a financial app, a corporate app, a social media app, a fitness app) being accessed by a user when the defined biometric threshold was exceeded and/or the defined gesture was detected. The context of the accessed application may be applied as a weighting factor by AAM program 107 when determining whether an adverse situation exists. For example, AAM program 107 may be more likely to determine an adverse situation exists where the defined biometric threshold was exceeded and/or the defined gesture was detected while the user accessed a financial or corporate application, and less likely to determine an adverse situation where the user was accessing a fitness application. Defined AST/S may be stored within storage 124 or remote database 130 for subsequent modification and/or reference by AAM program 107.

Figure 3:
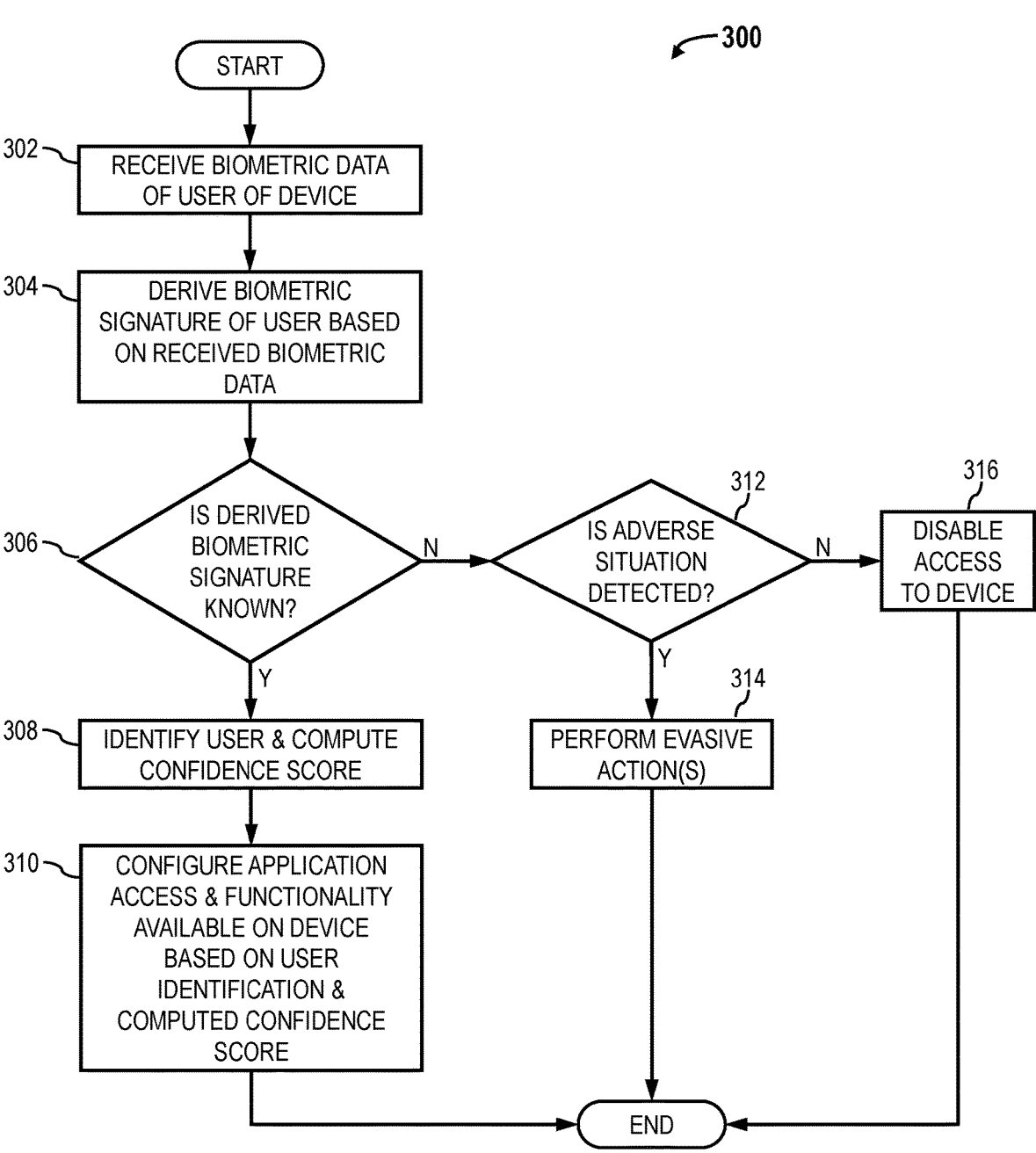
FIG. 3 illustrates an operational flowchart for configuring application access and functionality available to a user of a computing device via an application access management process, according to at least one embodiment.

Referring now to FIG. 3, an operational flowchart for configuring application access and functionality available to a user of a computing device via an application access management process 300 is depicted according to at least one embodiment. At 302, AAM program 107 receives biometric data of a user of a computing device. According to at least one embodiment, the computing device may be a smartphone and AAM program 107 may receive real-time biometric data of the user as they interact with the smartphone. For example, as the user interacts with the smartphone, AAM program 107 may receive one or more biometrics of the user such as, but not limited to, location information, facial measurements, user-specific haptic information, word typing speed, walking gate and/or accelerations, rate of speech, pitch, tone, vocabulary, and heartrate from sensors integrated within the smartphone and/or from sensors external to the smartphone but in communication with AAM program 107. According to at least one other embodiment, where biometric data of the user is not readily received by AAM program 107 as a result of the user's mere handling of the computing device, AAM program 107 may prompt the user, during their interaction with the computing device, to perform one or more actions, as described in step 202 of the application access management setup process 200, so that additional biometric data of the user may be received.

Next, at 304, AAM program 107 derives a biometric signature of the user based on the received real-time biometric data of the user as they interact with the computing device. According to at least one embodiment, AAM program 107 may input the received real-time biometric data resulting from the user's interaction with the smartphone into a CNN machine learning model which may apply feature extraction techniques on the input real-time biometric data, combine one or more behavioral patterns observed from each type of input real-time biometric data, evaluate variabilities of sensors capturing the input real-time biometric data, and output a real-time biometric model (i.e., biometric signature) of the user as they interact with the smartphone.

At 306, AAM program 107 determines whether the derived real-time biometric signature of the user is known. In making this determination, AAM program 107 may, according to at least one embodiment, reference application access control profiles stored within storage 124 or remote database 130 to determine if the derived real-time biometric signature of the user matches, within a threshold degree, a biometric signature associated with a stored application access control profile (e.g., an application access control profile of a primary user or a non-primary user. In response to determining that the derived real-time biometric signature of the user is known (i.e., the derived real-time biometric signature of the user matches, within a threshold degree, a biometric signature associated with a stored application access control profile) (step 306, "Y" branch), the application access management process 300 may proceed to step 308. In response to determining that the derived real-time biometric signature of the user is not known (i.e., the derived real-time biometric signature of the user does not match, within a threshold degree, a biometric signature associated with a stored application access control profile) (step 306, "N" branch), the application access management process 300 may proceed to step 312.

Next, at 308, in response to determining that the derived real-time biometric signature of the user is known, AAM program 107 identifies the user and computes a confidence score. According to at least one embodiment, identification of the user may be based on a user identity specified within the stored application access control profile associated the biometric signature matching the derived real-time biometric signature. Furthermore, the confidence score may be based on a comparison between the biometric signature associated with the stored application access control profile and the derived real-time biometric signature. According to at least one embodiment, as part of computing the confidence score, AAM program 107 may utilize the root mean square error (RMSE) deviation to compute the error between the known biometric signature (i.e., the biometric signature associated with the stored application access control profile) and the derived real-time biometric signature. AAM program 107 may then convert the computed RMSE into the confidence score by subtracting the computed RMSE from one (i.e., confidence score=1-computed RMSE). Furthermore, AAM program 107 may utilize the standard deviation of the error computation to create a range. According to at least one embodiment, the computed confidence score may represent a value which indicates how confidently the derived real-time biometric signature matches the known biometric signature.

At 310, AAM program 107 configures application access and functionality available to the user via the computing device based on the identification of the user and the computed confidence score. According to at least one embodiment, AAM program 107 may reference the stored application access control profile associated with the known biometric signature to enable application access according to a defined listing and/or defined categories of applications on the computing device which may be accessed by the user. Additionally, AAM program 107 may reference the stored application access control profile to also enable an applicable level of functionality (i.e., permissible functions/transactions available via API calls) for applications accessible by the user in accordance with how the computed confidence score relates to the confidence thresholds defined within the stored application access control profile. According to at least one other embodiment, AAM program 107 may also disable or hide applications on the computing device which are not part of the defined listing and/or the defined categories of applications which may be accessed by the user. For example, where the user of the smartphone is identified as a family member (i.e., a non-primary user) having a known biometric signature associated with a stored secondary application access control profile, and where the computed confidence score has a value which exceeds a threshold of eighty percent, AAM program 107 may reference the stored secondary application access control profile of the user and enable full access (i.e., access with unrestricted functionality or unrestricted API calling ability) by the user to a defined set or category of applications on the smartphone. Moreover, AAM program 107 may disable or hide applications of the smartphone which are not within the defined set or category of applications accessible by the user. As another example, where the user of the smartphone is identified as the owner (i.e., the primary user) having a known biometric signature associated with a stored primary application access control profile, and where the computed confidence score has a value which exceeds a threshold of eighty percent, AAM program 107 may reference the stored primary application access control profile of the user and enable full access (i.e., access with unrestricted API calling ability) by the user to all applications on the smartphone.

Table 1 below provides further examples of how AAM program 107 may, according to at least one other embodiment, configure application access and functionality available to known and unknown users via a computing device based on their respective identifications and respective computed confidence scores. As shown in Table 1, in a scenario where received biometric data of a user such as voice data, used vocabulary, typing style, and haptic data, result in identification, by AAM program 107, of the user as the known owner of the computing device, AAM program 107 may configure application access and functionality available to the owner, via the computing device, in accordance with definitions within their stored application access control profile. The scenario may change in that another user (e.g., a child of the owner) may subsequently interact with the computing device. In such a change of scenario, AAM program 107 may identify the other user as known user 1, based on subsequently received biometric data, and may configure application access and functionality available to user 1, via the computing device, in accordance with definitions within their stored application access control profile. Furthermore, according to at least one other embodiment, AAM program 107 may utilize varying authentication methods to revalidate a known user. For instance, in a case where known user 1 is attempting to access an application which is not defined within their stored application access control profile as accessible, AAM program 107 may display a message to known user 1 stating that they do not have access to the application. AAM program 107 may also notify the owner of the attempted access and prompt the owner to allow access to the application by user 1, or to confirm no access to the application by user 1. As also shown in Table 1, where an unknown user is subsequently interacting the computing device, AAM program 107 may perform one or more evasive actions, as described below in step 314.

TABLE 1

| User Identification | Received Biometrics | Application Access & Functionality Control |
| --- | --- | --- |
| Owner (e.g., a parent) | Voice data via microphone, actual words chosen in dialog (e.g., via large language model (LLM) processing), typing style, haptic data | If conf. score > 80%, full access to all apps<br>If conf. score between 50% to 80%, limit app functionality<br>If conf. score < 50%, only access to pre-determined apps & possibly deploy additional authentication mechanism |
| User 1 (e.g., an 18 y/o child) | Change in voice, lower grade vocabulary, teenager slang, unique haptics, varying authentication for revalidation | If conf. score > 80%, full access to pre-determined apps<br>If conf. score between 50% to 80%, limit app functionality of pre-determined apps<br>If conf. score < 50%, no access |
| User 2 (e.g., a 5 y/o child) | Change in voice, limited vocabulary, height difference, unique haptics, typing speed | If conf. score > 80%, full access to pre-determined apps<br>If conf. score between 50% to 80%, limit app functionality of pre-determined apps<br>If conf. score < 50%, no access |
| Stranger (e.g., an unknown user) | All biometrics behave different; no match with a known biometric signature | If adverse situation, perform pre-determined evasive action(s)<br>If not adverse situation, lock device |

At 312, in response to determining that the derived real-time biometric signature of the user is not known, AAM program 107 determines whether an adverse situation is detected. In making this determination, AAM program 107 may, according to at least one embodiment, evaluate one or more of the biometrics of the user received at step 302 against the adverse situation triggers/settings stored within storage 124 or remote database and defined as part of application access management setup process 200. For example, AAM program 107 may determine an adverse situation exists where a received biometric of the user exceeds a corresponding biometric threshold defined within the AST/S and/or where a gesture defined within the AST/S has been detected. In response to determining that an adverse situation is detected (step 312, "Y" branch), the application access management process 300 may proceed to step 314. In response to determining that an adverse situation is not detected (step 312, "N" branch), the application access management process 300 may proceed to step 316.

Next, at 314, in response to determining that an adverse situation is detected, AAM program 107 performs one or more evasive actions via the computing device. According to at least one embodiment, the evasive actions performed by AAM program 107 may include, but are not limited to, suspending or disabling the execution of certain types of application activities or services (e.g., financial transactions) via the computing device, marking or flagging certain types of executed application activities or services as being potentially fraudulent, hiding certain categories of computing device applications (e.g., email, financial, and corporate applications), and notifying application providers and/or other authorities (e.g., law enforcement agencies, medical personnel) of the detected adverse situation. For example, AAM program 107 may notify a banking application provider that potentially unauthorized access of a user's computing device (e.g., their smartphone) has occurred and recommend that additional security controls be enforced on banking accounts of the user. According to at least one other embodiment, AAM program 107 may also implement a false user interface (e.g., a fake front-end) for an application of the computing device as part of the one or more evasive actions performed in response to determining that an adverse situation is detected. For example, in the event of a detected adverse situation, AAM program 107 may provide a fake front-end for a financial application installed on the smartphone. This false user interface for the financial application may give the appearance that financial transactions are able to execute via the smartphone when, in actuality, financial transactions are disabled.

According to at least one other embodiment, it should be noted that even where the derived real-time biometric signature of the user is known (i.e., the derived real-time biometric signature of the user matches, within a threshold degree, a biometric signature associated with a stored application access control profile), AAM program 107 may nevertheless determine the existence of an adverse situation whenever a gesture, as defined within the AST/S of the computing device or within the stored application access control profile of the user, is detected and/or whenever a received biometric of the user exceeds a corresponding biometric threshold defined within the AST/S. In such an embodiment, in response to determining the existence of an adverse situation, AAM program 107 may perform one or more evasive actions as defined within the stored application access control profile of the user. Evasive actions defined within a stored application access control profile may include, but are not limited to, suspending or disabling the execution of certain types of application activities or services (e.g., financial transactions) via the computing device, marking or flagging certain types of executed application activities or services as being potentially fraudulent, hiding certain categories of computing device applications (e.g., email, financial, and corporate applications), notifying application providers and/or other authorities of the detected adverse situation, and providing a false user interface for an application of the computing device.

At 316, in response to determining that the derived real-time biometric signature of the user is not known, and an adverse situation is not detected, AAM program 107 disables access to the computing device by the user. For example, where an unknown user is interacting with the computing device (e.g., the smartphone), yet an adverse situation has not been detected, AAM program 107 may lock down the computing device (e.g., activate a lock screen of the smartphone).

According to at least one other embodiment, AAM program 107 may dynamically perform the steps of application access management process 300 continuously as a stream of biometric data of a known user is received by AAM program 107 while the user interacts with the computing device. As such, application accessibility and corresponding functionality which is available to the user via the computing device may accordingly change as successive real-time biometric signatures of the user are derived and successive confidence scores, which indicate how confidently a derived real-time biometric signature matches a known biometric signature, are computed. For example, consider a scenario in which a first derivation of a real-time biometric signature, and corresponding computed confidence score, of a known user interacting with a smartphone enables limited access by the user to a set of applications of the smartphone, as defined in their application access control profile. Application accessibility and corresponding functionality available to the known user while interacting with the smartphone may be stepped-up (i.e., increased or improved), in accordance with their application access control profile, if a later computed confidence score, resulting from a later derivation of a real-time biometric signature of the user, improves. Likewise, application accessibility and corresponding functionality available to the known user while interacting with the smartphone may be stepped-down (i.e., reduced or degraded), in accordance with their application access control profile, if a later computed confidence score, resulting from a later derivation of a real-time biometric signature of the user, worsens. Such an embodiment may ensure that an applicable level of application accessibility and functionality, via the computing device, is dynamically adjusted, in accordance with defined application access control profiles, as different known users interact with the computing device. For example, in the context of a family, parents and children may sometimes use the same device to perform certain actions via certain applications. Many a time the device may have corporate applications (e.g., email, documents, etc.) that the device owner (e.g., a parent) might want to restrict to oneself. There could also be banking applications on the device that owner might want to enable access by a spouse (e.g., the other parent) but not by the children. AAM program 107 may configure access to the corporate and banking applications based on the application access control profile and confidence score of the user currently interacting with the device.

Moreover, according to at least one further embodiment, where a later computed confidence score, resulting from a later derivation of a real-time biometric signature of a known user while interacting with a computing device, falls below a specified threshold, AAM program 107 may lock down the computing device (e.g., activate a lock screen of the smartphone) so as to prevent further application access by the user via the computing device. Furthermore, according to at least one other embodiment, as biometric behavior patterns of a known user may change over time, AAM program 107 may accordingly update the biometric signature associated with a stored application access control profile of the known user by continuously or periodically evaluating the known user's received biometrics as they interact with the computing device over time. Additionally, confidence thresholds defined within a stored application access control profile may also be updated.

According to yet another embodiment, AAM program 107 may also govern a known user's ability to log into a computing device. For example, in the context of a known user attempting to log into a smartphone, as the known user types the passcode into the smartphone, AAM program 107 may derive a real-time biometric signature of the known user and compare it with the biometric signature associated with the stored application access control profile of the known user. If the computed confidence score resulting from the comparison is within a specified threshold, AAM program 107 may allow the user entry into the smartphone, otherwise AAM program 107 may provide a message to the user. Moreover, AAM program 107 may also interact with current passcode detection methods of the computing device to lock the device out after a specified number of failed attempts to enter the passcode.

Referring now to FIG. 4, a framework 400 for allowing application developers to access functionality of AAM program 107 is depicted according to at least one embodiment. The framework 400 may allow developers of applications 410, which may include low risk applications (i.e., applications without access to sensitive or personal information) such as, but not limited to, phone call app 411, gaming app 412, news app 413, and configuration app 414, to utilize API calls to AAM program 107 so that permissible application access and functionality via a computing device may be enabled based on user identifications and stored application access control profiles as discussed above in the steps of application access management process 300. Likewise, the framework 400 may allow developers of applications 420, which may include higher risk applications (i.e., applications with access to sensitive or personal information) such as, but not limited to, finance app 421, corporate app 422, messaging app 423, and health app 424, to utilize API calls to AAM program 107 so that application access and functionality via a computing device may be limited based on user identifications and stored application access control profiles as discussed above in the steps of application access management process 300.

It may be appreciated that FIG. 2, FIG. 3, and FIG. 4 respectively provide only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

receiving real-time biometric data of a user as the user interacts with a computing device;

deriving a real-time biometric signature of the user based on the received real-time biometric data;

responsive to determining that the real-time biometric signature is known, identifying the user, and computing a confidence score of the real-time biometric signature, wherein the computed confidence score is based on a computed root mean square error deviation between a biometric signature associated with an application access control profile, of one or more stored application access control profiles, and the real-time biometric signature;

based on identification of the user and the computed confidence score, configuring accessibility and corresponding application programming interface (API) call functionality of one or more applications available to the user via the computing device, wherein configuring the API call functionality is based on how the computed confidence score relates to confidence thresholds defined within the application access control profile;

continuously performing the receiving and the deriving as the user interacts with the computing device; and while a successive real-time biometric signature is known, continuously performing the identifying, the computing, and the configuring as the user interacts with the computing device.

2. The method of claim 1, wherein deriving the real-time biometric signature of the user further comprises:

inputting the received real-time biometric data of the user into a machine learning model; wherein the received real-time biometric data comprises one or more types of biometric data, and wherein the real-time biometric data is received from one or more sensors;

combining, via the machine learning model, one or more behavioral patterns observed from each type of input biometric data;

evaluating, via the machine learning model, variabilities of the one or more sensors; and outputting, via the machine learning model, a real-time biometric model of the user.

3. The method of claim 1, wherein determining that the real-time biometric signature is known further comprises:

referencing the one or more stored application access control profiles, wherein each application access control profile of the one or more stored application access control profiles is associated with a respective biometric signature of a known user of the computing device; and determining that the real-time biometric signature matches, within a threshold degree, the biometric signature associated with the application access control profile of the one or more stored application access control profiles.

4. The method of claim 1, wherein identification of the user is based on a user identity specified within the application access control profile associated with the biometric signature, and wherein configuring the accessibility is based on a defined listing and/or defined categories of applications on the computing device which are specified in the application access control profile as accessible by the user.

5. The method of claim 1, wherein continuous performance of the configuring comprises dynamically increasing or decreasing application accessibility and/or application API call functionality available to the user via the computing device.

6. The method of claim 1, further comprising:

responsive to determining that the real-time biometric signature is unknown, determining whether an adverse situation exists; and responsive to determining that an adverse situation does exist, performing one or more evasive actions via the computing device.

7. The method of claim 6, further comprising:

responsive to determining that an adverse situation does not exist, disabling access to the computing device by the user.

8. A computer system, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving real-time biometric data of a user as the user interacts with a computing device;

deriving a real-time biometric signature of the user based on the received real-time biometric data;

responsive to determining that the real-time biometric signature is known, identifying the user, and computing a confidence score of the real-time biometric signature, wherein the computed confidence score is based on a computed root mean square error deviation between a biometric signature associated with an application access control profile, of one or more stored application access control profiles, and the real-time biometric signature;

based on identification of the user and the computed confidence score, configuring accessibility and corresponding application programming interface (API) call functionality of one or more applications available to the user via the computing device, wherein configuring the API call functionality is based on how the computed confidence score relates to confidence thresholds defined within the application access control profile;

continuously performing the receiving and the deriving as the user interacts with the computing device;

while a successive real-time biometric signature is known, continuously performing the identifying, the computing, and the configuring as the user interacts with the computing device.

9. The computer system of claim 8, wherein deriving the real-time biometric signature of the user further comprises:

inputting the received real-time biometric data of the user into a machine learning model; wherein the received real-time biometric data comprises one or more types of biometric data, and wherein the real-time biometric data is received from one or more sensors;

combining, via the machine learning model, one or more behavioral patterns observed from each type of input biometric data;

evaluating, via the machine learning model, variabilities of the one or more sensors; and outputting, via the machine learning model, a real-time biometric model of the user.

10. The computer system of claim 8, wherein determining that the real-time biometric signature is known further comprises:

referencing the one or more stored application access control profiles, wherein each application access control profile of the one or more stored application access control profiles is associated with a respective biometric signature of a known user of the computing device; and determining that the real-time biometric signature matches, within a threshold degree, the biometric signature associated with the application access control profile of the one or more stored application access control profiles.

11. The computer system of claim 8, wherein identification of the user is based on a user identity specified within the application access control profile associated with the biometric signature, and wherein configuring the accessibility is based on a defined listing and/or defined categories of applications on the computing device which are specified in the application access control profile as accessible by the user.

12. The computer system of claim 8, wherein continuous performance of the configuring comprises dynamically increasing or decreasing application accessibility and/or application API call functionality available to the user via the computing device.

13. The computer system of claim 8, further comprising:

responsive to determining that the real-time biometric signature is unknown, determining whether an adverse situation exists; and responsive to determining that an adverse situation does exist, performing one or more evasive actions via the computing device.

14. The computer system of claim 13, further comprising:

responsive to determining that an adverse situation does not exist, disabling access to the computing device by the user.

15. A computer program product, the computer program product comprising:

one or more computer-readable tangible storage medium and program instructions stored on at least one of the one or more tangible storage medium, the program instructions executable by a processor capable of performing a method, the method comprising:

receiving real-time biometric data of a user as the user interacts with a computing device;

deriving a real-time biometric signature of the user based on the received real-time biometric data;

responsive to determining that the real-time biometric signature is known, identifying the user, and computing a confidence score of the real-time biometric signature, wherein the computed confidence score is based on a computed root mean square error deviation between a biometric signature associated with an application access control profile, of one or more stored application access control profiles, and the real-time biometric signature;

based on identification of the user and the computed confidence score, configuring accessibility and corresponding application programming interface (API) call functionality of one or more applications available to the user via the computing device, wherein configuring the API call functionality is based on how the computed confidence score relates to confidence thresholds defined within the application access control profile;

continuously performing the receiving and the deriving as the user interacts with the computing device; and while a successive real-time biometric signature is known, continuously performing the identifying, the computing, and the configuring as the user interacts with the computing device.

16. The computer program product of claim 15, wherein deriving the real-time biometric signature of the user further comprises:

inputting the received real-time biometric data of the user into a machine learning model;

wherein the received real-time biometric data comprises one or more types of biometric data, and wherein the real-time biometric data is received from one or more sensors;

combining, via the machine learning model, one or more behavioral patterns observed from each type of input biometric data;

evaluating, via the machine learning model, variabilities of the one or more sensors; and outputting, via the machine learning model, a real-time biometric model of the user.

17. The computer program product of claim 15, wherein determining that the real-time biometric signature is known further comprises:

referencing the one or more stored application access control profiles, wherein each application access control profile of the one or more stored application access control profiles is associated with a respective biometric signature of a known user of the computing device; and determining that the real-time biometric signature matches, within a threshold degree, the biometric signature associated with the application access control profile of the one or more stored application access control profiles.

18. The computer program product of claim 15, wherein identification of the user is based on a user identity specified within the application access control profile associated with the biometric signature, and wherein configuring the accessibility is based on a defined listing and/or defined categories of applications on the computing device which are specified in the application access control profile as accessible by the user.

19. The computer program product of claim 15, wherein continuous performance of the configuring comprises dynamically increasing or decreasing application accessibility and/or application API call functionality available to the user via the computing device.

20. The computer program product of claim 15, further comprising:

responsive to determining that the real-time biometric signature is unknown, determining whether an adverse situation exists; and responsive to determining that an adverse situation does exist, performing one or more evasive actions via the computing device.

\* \* \* \* \*